United States Patent [19]
Platz

[11] 3,783,804
[45] Jan. 8, 1974

[54] SUB-SURFACE ROOT FERTILIZER AND PROBE

[76] Inventor: Edward A. Platz, Opossum Rd., Bellemead, N.J. 08502

[22] Filed: Apr. 21, 1972

[21] Appl. No.: 245,959

[52] U.S. Cl............................ 111/7.4, 239/DIG. 4
[51] Int. Cl............................................ A01c 23/02
[58] Field of Search... 172/7.1–7.4; 239/276, DIG. 4

[56] References Cited
UNITED STATES PATENTS

| 2,200,151 | 5/1940 | Burkhardt | 239/DIG. 4 |
| 3,107,638 | 10/1963 | Johnston | 111/7.1 |
| 3,174,690 | 3/1965 | Weismann | 239/276 |

FOREIGN PATENTS OR APPLICATIONS

| 1,050,108 | 2/1959 | Germany | 111/7.4 |
| 757,208 | 9/1956 | Great Britain | 111/7.4 |

Primary Examiner—Stephen C. Pellegrino
Attorney—Leonard W. Sherman et al.

[57] ABSTRACT

A sub-surface root fertilization apparatus for use in injecting the soil with a concentrated liquid fertilizer comprising a frame, a portion of the frame adapted to receive at least one tank, at least one tank within this portion, a pump mounted on the frame having an inlet and an outlet, a tube communicating one of the tanks with the input of the pump, control means for operating the pump, a probe having a mounting chuck at one end, a fluid passage within the probe, the fluid passage terminating in a nozzle means at the end of the probe opposite the mounting chuck, a tube mounted on the probe communicating the probe with the outlet of the pump and an impact hammer attached to the mounting chuck of the probe.

11 Claims, 8 Drawing Figures

3,783,804
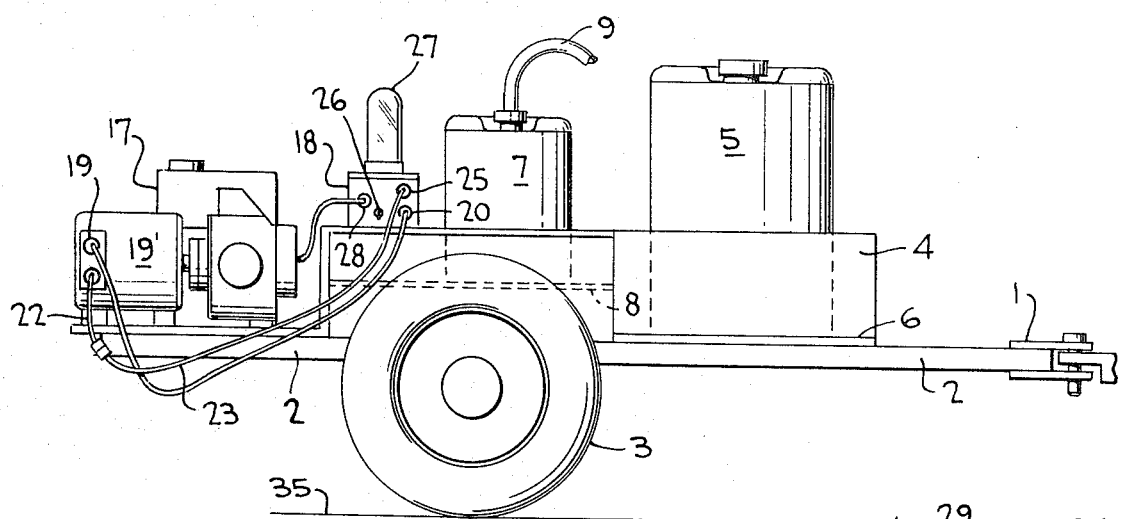
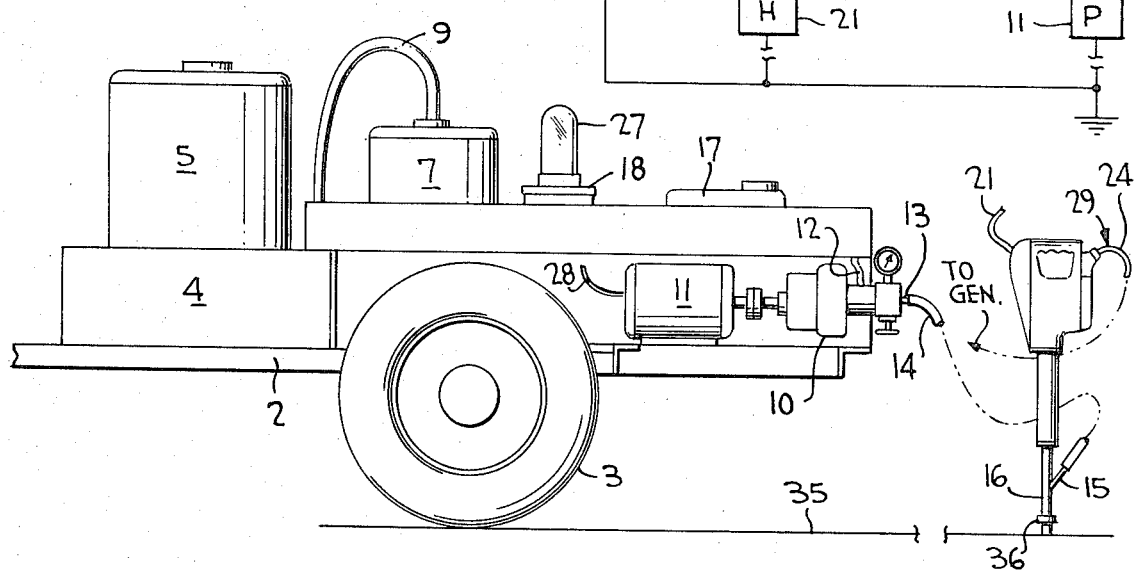

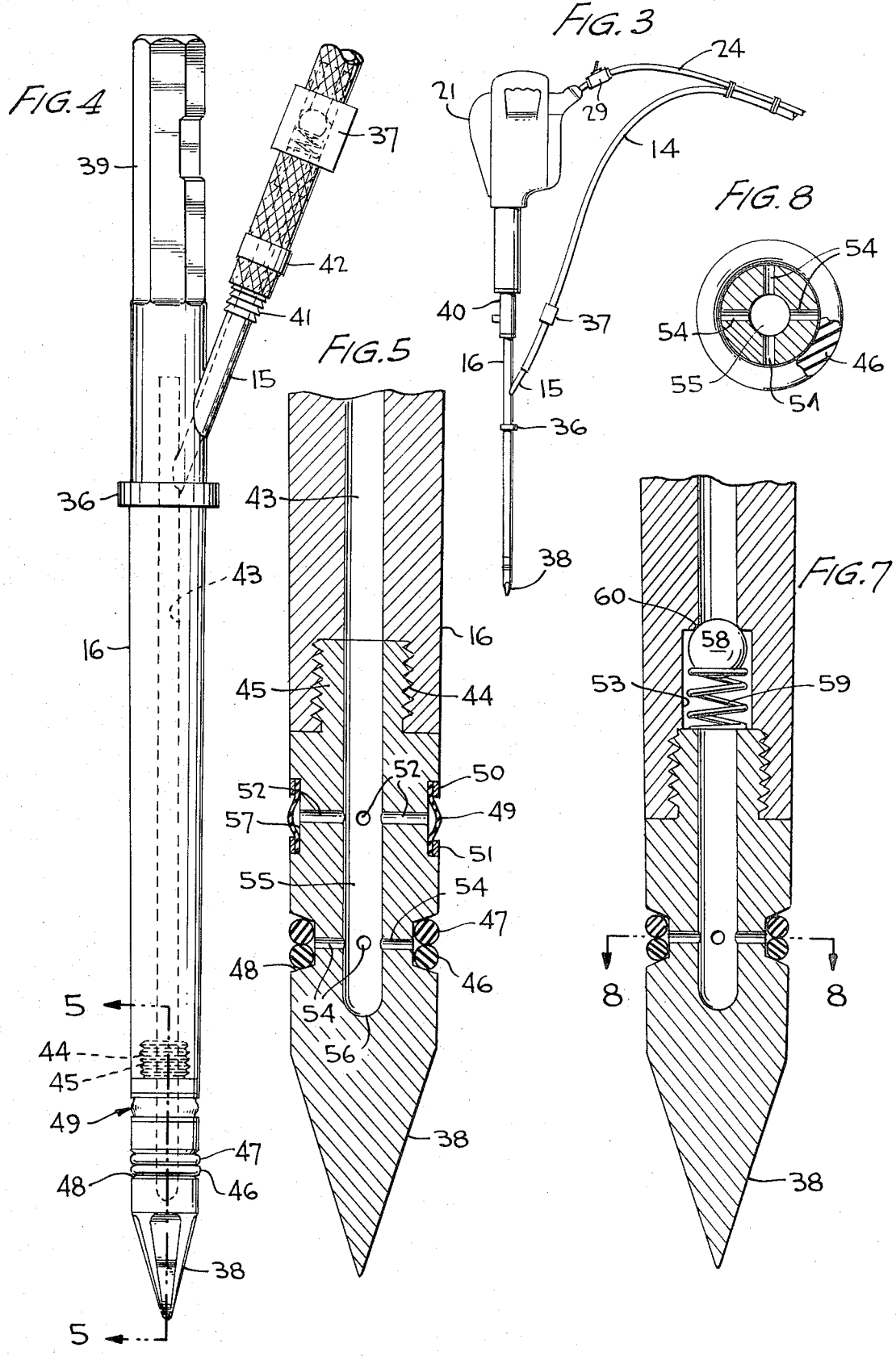

SUB-SURFACE ROOT FERTILIZER AND PROBE

BACKGROUND OF THE INVENTION

This invention relates to sub-surface root fertilization apparatus. More particularly, this invention relates to a subsurface root fertilization apparatus which quickly and effectively injects liquid fertilizer into the soil around the base of trees and other similar bushes and shrubs which require sub-surface root fertilization.

Horticulturists, gardners and homeowners recognize that trees, shrubs and bushes require a significant amount of fertilization and that such fertilization is effective only when it reaches the roots of the trees, bushes and shrubs. Dry fertilizers which are placed in the soil or on the soil above the roots of the trees do not adequately fertilize the same nor does this method allow for the horticulturist, gardner or homeowner to closely regulate the amount of fertilization these trees, shrubs and bushes receive since, due to various climate conditions, i.e., wind, soil and rain, the amount of actual fertilizer which reaches the roots may be a small fraction of the same amount initially applied. Clearly, this is inefficient with regard to both fertilizers since a large excess must be applied in order to assure that a specified minimum reaches the roots and also it is often difficult to apply these fertilizers in these amounts around the base of the trees, shrubs and bushes conveniently.

Prior art sub-surface root fertilizers utilized a carrier of water or other material supplied from a garden hose or the like in order to dissolve a dry fertilizer and apply the same below the ground. This method has the inherent deficiency that a large amount of water must also be forced underground thereby making the operation cumbersome and time-consuming since it is difficult to deposit a great amount of this dissolved dilute material below the soil so that the trees, shrubs and bushes receive their proper nourishment.

Furthermore, there are a number of large devices for use in injecting various chemicals around trees, telephone poles, etc., which, such as disclosed in U.S. Pat. No. 3,450,073, in effect latch onto or grapple the tree or pole and utilize the same to force the probe into the ground. Although such devices are capable of depositing a concentrated solution of material below the surface of the soil, the utilization of the tree to force the probe into the ground may result in damage to the tree and also only allows this device to be utilized with large well-established trees and not with small bushes and shrubs which also need sub-surface root fertilization. Other soil-injection devices, such as disclosed in U.S. Pat. No. 2,619,055, utilize the weight of the device itself which is a slow and cumbersome process and necessitates that the device itself must have some bulk and weight which makes it difficult to maneuver easily and to position the same in the proper relationship to the tree, bush or shrub to be fertilized. Also, U.S. Pat. No. 3,071,200 discloses a drill for injecting a fluid below the ground. This patent discloses the utilization of a rotary device to bore into the ground so as to deposit a liquid or fluid for insect control or fertilization. This patent discloses a drill type probe or chuck; however, the use of a rotary drill creates various problems with regard to the connection of the supply and also the nozzle at the base of the probe is open so that dirt may jam the probe during the insertion and also so that a non-even flow of fluid is deposited into the ground.

The various probes utilized with these devices do not have any means to insure that the fluid flow coming from the interior of the probe is evenly distributed around the nozzle nor do these probes have any control over leakage of residual liquid within the probe during insertion and removal of the probe. Furthermore, there is no provision in prior art devices for accurately controlling the amount of material deposited below the ground.

BRIEF DESCRIPTION OF THE INVENTION

It is within the above-noted environment that the sub-surface root fertilizer injector of the present invention and the probe for use therewith were developed. Briefly, the subsurface root fertilizer injector of the present invention comprises a frame having a platform for holding a plurality of tanks, at least one tank on this platform, pumping means attached to the frame including control means, the input of the pumping means communicating with one of the tanks, a generally cylindrical probe having a flow passage for fluid flow and having a mounting chuck at one end and a conical tip at the other end, the output of the pumping means communicating with the fluid passage within the probe, the fluid passage including at least one aperture through the walls of the probe near the conical end and an impact hammer attached to the chuck end of the probe. The probe comprises a generally cylindrical member having a mounting chuck attached to one end and a conical tip attached to the other end, the probe having a flow passage within the probe for fluid flow, this flow passage including a generally cylindrical member extending from the probe near the mounting chuck, this generally cylindrical member having a flow passage for fluid flow, this flow passage communicating with the flow passage in the probe, the probe flow passage communicating with at least one aperture through the wall of the probe near the conical tip of the probe, at least two O-rings mounted within a recess in the outer wall of the probe, the aperture through the probe terminating below these annular rings, the annular rings being such that when a fluid flows through the central passage and through the aperture of the probe, the two O-rings will move apart and evenly distribute the liquid throughout 360°.

It is therefore a primary object of the present invention to provide a portable, fast and efficient apparatus for use in sub-surface root fertilization of trees, shrubs and bushes.

It is a further object of the present invention to provide a sub-surface root fertilizer injector which is capable of quickly and efficiently injecting a predetermined amount of a liquid fertilizer below the soil without disturbing the trees, shrubs, bushes or surface plantings of grass or other ground cover.

It is a still further object of the present invention to provide a sub-surface root fertilizer injector which may be easily operated by one person without setting manual valves.

It is a still further object of the present invention to provide a probe for use in sub-surface root fertilization which maintains line pressure and inhibits leakage of fertilizer during handling.

It is a still further object of the present invention to provide a probe wherein the apertures for distributing the fluid are protected during insertion from clogging and further wherein the fluid dispensed is evenly dispersed around the probe.

It is a still further object of the present invention to provide a sub-surface root fertilizer which can be easily adapted to varying soil conditions, tree sizes, and liquid fertilizer formulas.

It is a still further object of the present invention to provide a sub-surface root fertilizer injector which is capable of injecting a pre-determined amount of liquid fertilizer, this amount being readily adjustable into the soil over a short period of time.

Still further objects and advantages of the apparatus of the present invention will become more apparent from the following more detailed description thereof.

DETAILED DESCRIPTION OF THE INVENTION

The apparatus of the present invention will now be illustrated by way of the attached drawings wherein FIG. 1 is a right side view of the apparatus of the present invention;

FIG. 2 is a side view from the opposite side of FIG. 1 of the apparatus of the present invention;

FIG. 3 is a side view of the impact hammer and probe in position ready for insertion;

FIG. 4 is a side view of the probe of the present invention;

FIG. 5 is a view of FIG. 4 taken along line 5—5;

FIG. 6 is a schematic diagram showing the control system for use in the apparatus of the present invention;

FIG. 7 is an alternative embodiment of the probe as shown in FIG. 5; and

FIG. 8 is a view taken along line 8—8 in FIG. 7.

Referring to FIGS. 1 and 2 which show right and left side views of the apparatus of the present invention, the apparatus is designed to be drawn by any conventional garden tractor, not shown, by means of trailer hitch 1 attached directly to the tractor. Trailer hitch 1 is attached by any conventional means to frame 2 which is mounted on at least two wheels 3. Frame 2 may be constructed out of any conventional material such as wood or a light tubular or structural metal and includes a platform 6 mounted on frame 2. Attached to the forward portion of platform 3 are sidewalls 4 which enclose a portion of trailer 2 so that various liquid fertilizer tanks 5 may be stored before use. The actual tank in use 7 may either be placed on platform 6 or may be on platform 8 over wheels 3. Tubing 9 extends from tank 7 to the inlet 12 of pump 10 which is driven by motor 11. Pump 10 may be any conventional pump, preferably a positive displacement pump, capable of maintaining a line pressure of around 400 psi. The output 13 of pump 10 is attached to a flexible hose 14 which is directly connected to hose connection 15 on root fertilization probe 16.

Pump 10 is driven by an electric motor 11 which in turn is powered by a gas driven generator 17. Generator 17 provides all the power for the electrically operated components of the apparatus of the present invention. As will be discussed later with reference to FIG. 6, the power for pump motor 11 from generator 17 passes through control box 18 which contains the timing and selection mechanism for the mode of operation of the pump. Both generator 17 and control box 18 are mounted on platform 6 or platform 8 as shown. Generator 17 has at least two output connections 19 and 19'. Output connection 19 is attached directly to input connection 20 of control box 18. Output 19' is directly connected to the electric motor in impact hammer 21 by line 22. Line 22 is cabled with a second line 23 to form cable 24 which extends from under frame 2 to the electrical input of electric impact hammer 21. Impact hammer 21 could also be pneumatically actuated although an electric hammer is preferred. Line 23 in cable 24 is connected to connection 25 in control box 18. Control box 18 also includes a manual off-on switch 26 and an indicating light 27 which shows when the pump is operating and fluid is being injected into the soil. Output line 28 extends from control box 18 to the input of electric motor 11. When the control circuit is actuated, electric motor 11 powers pump 10 which in turn pumps liquid fertilizer from tank 7 through line 9 into line 14 and ultimately into probe 16 for injection into the ground. This control circuit is operated by a switch 29 mounted on impact hammer 21 so that the operator can remotely actuate pump 10.

Referring to FIG. 6 which shows the basic elements of the control circuitry of the apparatus of the present invention, the 110 volt AC power source is supplied by generator 17 which is directly connected to hammer 21 which is controlled by switch 30. Manual switch 26 is connected to remote control switch 29 which, as indicated above, is mounted in proximity to the impact hammer so that the pump may be operated or actuated immediately after the prove is inserted into the ground. Selection switch 31 may be any conventional two pole switch which allows the current to flow through either branch 33, which is directly connected to pump motor 11 for manual operation or manual timing of the injection, or through line 32 which is connected to timer mechanism 34. Timing mechanism 34 may be any conventional timer which allows current to flow for a specific pre-determined period of time. Preferably, timer 34 will be such that the timer does not have to be reset each individual time since this type of timing mechanism will facilitate the rapid injection of a large amount of liquid fertilizer without constant adjustment and without the operator having to return to the main apparatus thereby remotely operating the same at distances up to several hundred feet. As indicated in the schematic diagram, indicating light 27 is connected in series with pump motor 11 so as to indicate to the operator when the pump motor is operating and liquid fertilizer is flowing into probe 16.

In operation, the gardner, homeowner or horticulturist places tube 9 inside a tank of appropriate concentrated liquid fertilizer and sets the timer in control box 18 to a pre-determined length of time. Generally timer 34, as noted above, is a conventional type timer which may be set for periods of time from one-fifth second to 60 seconds so that the same in conjunction with the solids content of the liquid fertilizer may be utilized to accurately determine the amount of fertilizer injected into the ground. The operator starts generator 17 and throws switch 26 on so that switch 29 can operate timing mechanism 34 which in turn operates pump 10. The impact hammer with attached probe is then carried to the base of the tree or shrub to be fertilized and the impact hammer is actuated driving the probe into ground 35 up to stop ring 36 mounted on probe 16. Stop ring 36 is an adjustable marking ring which enables the operator to insure that the probe will be implanted into the ground the same depth for each fertilizing operation. When the probe has reached the proper depth, the impact hammer is stopped and switch 29 is thrown to actuate timer 34 which in turn actuates pump motor 11 which drives pump 10 to pump the pre-determined amount of liquid fertilizer from tank 7 into probe 16 and ultimately into the ground. This operation can be carried out by a single person without the assistance of any one, and when an injection period of 5 to 10 seconds is utilized, the operator can fully fertilize a large tree requiring 4 to 6 holes in less than two minutes with a minimum of effort on his part. Preferably, tube 14 and cable 24 will be a sufficient length so that the operator after setting the timer for the desired injection rate and starting the apparatus may fertilize well over fifty trees, this, of course, depending upon the size of the liquid fertilizer tank utilized and the proximity of the various trees to one another.

One of the primary advantages to the apparatus of the present invention is that the basic apparatus may be placed in a central location while the probe and hammer may be easily moved so that the operator can inject the fertilizer close to the trunk of the bush or tree without in any way disturbing the soil, grass or other landscaped features of the area. As noted above, it is generally preferred to utilize a tubing 14 and cable 24 of a significant length, i.e., around 50 or 100 feet, and in this regard it has been found that instead of utilizing separate cables and tubing, it is preferred to join the two together either by utilizing a single flexible tubing having two separate passageways, one for the flow of fluid and the other for containing the electrical wires, or to physically attach the cable and tubing together.

FIG. 3 shows a side view of probe 16 and impact hammer 21 attached to the chuck end of probe 16. FIG. 3 also shows the positioning of depth gauge 36 and barbed hose connection 15. Also, above barbed hose connection 15 and within the lower portion of hose 14 is a check valve 37 which maintains line pressure in hose 14. This check valve 37 should require a pressure of at least 50 psi before opening so that the pump pressure is sufficiently maintained before allowing liquid fertilizer into the interior of probe 16. Probe 16 has a tapered or pointed nozzle 38 to facilitate the implantation of this probe in the ground.

FIG. 4 shows an enlarged side view of probe 16. The top portion of probe 16 has a standard chuck fitting 39 sized to enable the same to be inserted and held by chuck 40 of impact hammer 21. Hose connection 15 has conventional barbing 41 so as to firmly secure hose 14 in place. As noted above, hose 14 has a check valve 37 fitted in close proximity to the termination of hose connection 15. In order to facilitate a tight connection, a pressure constrictor 42 may also be applied around the hose over barbing 41 so as to insure a tight, leak-free connection. Hose connection 15 is hollow and has a passageway which communicates hose 14 with central passageway 43 in probe 16. The main portion of probe 16 is basically a cylindrical tube which may or may not have a slight taper so that it becomes slightly larger in cross-section as the tube approaches hose connection 15. Generally, the lower portion of probe 16 has internal threads 44 which mate with male threaded member 45 on nozzle 38. This is to facilitate the changing of the head member and also to allow, as in one embodiment of the apparatus of the present invention, the insertion of a second check valve above this joint. Central passageway 43 terminates near nozzle 38 of probe 16 and is communicated to the outside by means of at least two passageways or outlets 54 which are covered by a pair of O-rings 46 and 47 which fit in a slot 48 in the nozzle 38 of probe 16. Also, nozzle 38 may be fitted with a compression member 49 which expands as liquid fertilizer is forced through passageways 54 and out between O-rings 46 and 47 in order to firmly block the passage of liquid fertilizer up and through the hole created by probe 16.

FIG. 5, which shows a view of the tip of probe 16 as indicated by line 5—5 in FIG. 4, clearly shows the internal threaded portion 44 of probe 16 and make threaded member 45 of nozzle 38. Nozzle 38 is removable so that when the tip becomes worn it can be easily replaced or a special tip can be used if necessary because of ground conditions. Joining central passage 43 is passageway 55 within nozzle 38 which terminates at end 56 located below outlets 54. Outlets 54 are arranged around passageway 55 and communicate this passageway with the outside of nozzle 38.

FIG. 8, which is a view taken along line 8-8 in FIG. 7, clearly shows that in the preferred embodiment of the present invention there are four passageways 54 extending from central passageway 56 to the outside. Furthermore, FIG. 8 shows that these passageways 54 are evenly arranged around the circumference of nozzle 38. Passageways 54 terminate in truncated V-shaped groove 48 which serves as a fitting for O-rings 46 and 47. As the pressure builds up within passageway 55, the liquid is forced out through passageways 54 thereby splitting O-rings 46 and 47 apart and evenly distributing the liquid fertilizer around the entire circumference of nozzle 38. O-rings 46 and 47 preferably fit tightly against passageways 54 so as to perform a three-fold function of evenly distributing the liquid fertilizer around the circumference of nozzle 38, also prevent dirt and other materials which might block passageways 54 from so clogging these passageways during insertion, and upon removal from the soil seals passageways 54 to prevent leakage of the fertilizer. Although the location of the O-rings has been shown on a flat portion of nozzle 38, these O-rings might be also located on the slanted portion of nozzle 38 although this location is less preferred. Located above passageways 54 in a second series of passageways 52 which communicate fluid pressure from central passageway 55 to the interior of a flexible diaphragm 49. This flexible diaphragm 49 may be any conventional material such as neoprene which is corrosion resistant and is held in place by a pair of stainless steel bands 50 and 51 within a circular recess 57. As the pressure within passageway 55 rises, diaphragm 49 expands against the side of the hole created by nozzle 38 and probe 16 and prevents the flow of liquid fertilizer coming through passageways 54 from following the hole created by probe 16 up to the surface of the soil. Utilization of this pressure seal insures that the liquid fertilizer will be concentrated and deposited completely in the soil at the desired pre-determined level.

FIG. 7 shows a second embodiment of the probe of the present invention wherein check valve 58 is placed within check valve recess 53 and held against check valve seat 60 by spring 59. This figure also shows the taper of probe 16 slightly exaggerated for illustrative purposes. This taper may either replace pressure sealing membrane 49 or be used in conjunction therewith so as to insure that the fertilizer is all deposited at the pre-determined level below the ground.

Since liquid fertilizers are generally mildly corrosive, it is preferred to construct the apparatus of the present invention from materials which are resilient to such corrosion. Furthermore, although the apparatus of the present invention has been illustrated utilizing two O-rings, it is also contemplated that either one or three or more O-rings may be utilized with appropriate modifications of the passageway 54 and notch 48 structure. One such modification utilizing a single O-ring would be to slant passageway 54 upwardly and to have notch 48 have a somewhat half-circular cross-section so that as the fluid passes through passageway 54, the single O-ring will be forced into the upper portion of the circular notch allowing the fluid to pass out. Also, utilizing three O-rings, the passageways communicating the central passageway with the notch may be staggered so as to provide a more even flow through each passageway and insure the even distribution of the liquid fertilizer in the ground. Furthermore, depth indicator 36 may be any conventional material which is capable of frictionally fitting on probe 16 yet which at the same time can be easily moved in order to vary the depth at which the probe will be sunk into the soil. Although the fertilizer is not as evenly dispersed on injection, the probe 16 may be utilized without any O-rings. Without the O-rings, the operator will preferably inject the fertilizer while probe 16 is being driven into the soil so that any blockage of passageways 54 is avoided by the fertilizer flow. Without O-rings, however, the operator must use care on withdrawal of the probe to prevent the spillage of fertilizer on vegetation of the top of the soil.

The apparatus of the present invention as noted above accurately and conveniently fertilizes a large number of trees, bushes and shrubs without disturbing the surrounding soil and by utilizing an impact hammer, the probe may be driven into any type of soil structure including clay or shale type soils.

Also, by modifying the probe nozzle, the basic apparatus of the present invention may be modified so as to provide a sprayer for leaf fertilizing or insecticide spraying thereby making the basic apparatus of the present invention far more useful than for mere subsurface root fertilization.

While the apparatus of the present invention has been illustrated by way of the foregoing specific embodiments and figures, the same should be in no way limited thereto but as construed as broadly as any and all equivalents and the following appended claims.

What I claim is:

1. A probe for use with a sub-surface root fertilizer comprising a generally cylindrical body having one generally conical end; a mounting chuck at the end of said body opposite said conical end; a centrally disposed central passage within said body extending substantially the length of said body having inlet means and outlet means, said inlet means communicating with a hose communication near said mounting chuck, said outlet means comprising at least one aperture through said body near said conical end, the axis of said aperture being at an angle with respect to the axis of said passage; a first circumferential notch on the surface of said body at the outlet of said aperture; and at least two O-rings seated in said notch covering said apertures, each ring being in contact with said notch, said O-rings being in side-by-side relationship so that fluid under pressure passing through said apertures will pass between said O-rings.

2. The probe of claim 1 wherein said central passage includes four apertures through said body.

3. The probe of claim 1 wherein there are two flexible O-rings.

4. The probe of claim 1 wherein said probe has a removable tip.

5. The probe of claim 1 wherein said hose connection is barbed.

6. The probe of claim 1 wherein said central passage additionally includes at least one added aperture through said body farther from said conical end than said circumferential notch and an expandable member mounted on said body completely covering the outlet of said added aperture.

7. The probe of claim 6 wherein said expandable member is mounted within a circumferential recess and is held in said recess by two stainless steel bands.

8. The probe of claim 6 wherein said passage for fluid flow includes four apertures through said body.

9. A tip for use with a sub-surface root fertilizer probe having a central passage for fluid flow comprising a body having a conical end and an end adapted to be connected to said probe, a central passageway within said body extending substantially the length of said body, said passageway having inlet means and outlet means, said inlet means adapted for communication with said central passage, and said outlet means comprising at least one aperture through said body, the axis of said aperture being at an angle with respect to the axis of said passageway, a circumferential notch on the surface of said body at the outlet of said aperture, at least two O-rings seated in side-by-side relationship in said notch covering said aperture, each O-ring being in contact with said notch, so that a fluid under pressure passing through said aperture will pass between said O-rings.

10. The tip of claim 9 wherein said central passage includes four apertures through said body.

11. The tip of claim 9 wherein there are two O-rings.

* * * * *